United States Patent
Summerland et al.

(10) Patent No.: US 9,888,533 B2
(45) Date of Patent: *Feb. 6, 2018

(54) POWER ADAPTORS

(71) Applicant: HOLDIP Limited, Douglas (GB)

(72) Inventors: David Thomas Summerland, Old Dalby (GB); Charles Pollock, Oakham (GB); Helen Pollock, Oakham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,540

(22) Filed: Aug. 5, 2015

(65) Prior Publication Data

US 2015/0341996 A1     Nov. 26, 2015

Related U.S. Application Data

(63) Continuation of application No. 13/066,244, filed on Apr. 8, 2011, now Pat. No. 9,124,193.

(30) Foreign Application Priority Data

Oct. 8, 2008   (GB) .................................... 0818411.1
Nov. 21, 2008  (GB) .................................... 0821297.9
(Continued)

(51) Int. Cl.
  *H05B 37/02*   (2006.01)
  *H05B 33/08*   (2006.01)
  *H02M 7/538*   (2007.01)

(52) U.S. Cl.
  CPC ............. *H05B 33/0815* (2013.01); *H02M 7/538* (2013.01); *H05B 33/0845* (2013.01); *Y02B 70/1441* (2013.01)

(58) Field of Classification Search
  CPC ............ H05B 41/3925; H05B 41/2828; H05B 41/28; H05B 41/2827; H05B 41/2855
  (Continued)

(56) References Cited

U.S. PATENT DOCUMENTS 2,661,645 A   12/1953   Heath
4,277,728 A   7/1981    Stevens
(Continued)

FOREIGN PATENT DOCUMENTS

EP   0567280      10/1993
EP   1 250 030    10/2002
(Continued)

OTHER PUBLICATIONS

Borage et al., (2005) "Analysis and Design of an LCL-T Resonant Converter as a Constant-Current Power Supply," *IEEE Transactions on Industrial Electronics*, 52(6): 1547-1554.
(Continued)

*Primary Examiner* — Minh D A
(74) *Attorney, Agent, or Firm* — Quine Intellectual Property Law Group, P.C.

(57) ABSTRACT

A power adaptor (20) is provided, comprising an input (22) for connection to an AC power supply, and a resonant circuit (34) coupled to the input (22) that provides an output suitable for driving a load (50). The capacitance and inductance of the resonant circuit (34) are selected to provide a pre-determined change in effective voltage, and a corresponding pre-determined change in effective current, between the input (22) and the output (24) of the power adaptor (20).

13 Claims, 8 Drawing Sheets

(30) Foreign Application Priority Data

Dec. 12, 2008 (GB) .................................. 0822691.2
May 28, 2009 (GB) .................................. 0909139.8

(58) Field of Classification Search
USPC ................. 315/224, 264, 265, 291, 311, 246
See application file for complete search history.

(56) References Cited

U.S. PATENT DOCUMENTS

| | | |
|---|---|---|
| 4,415,839 A | 11/1983 | Lesea |
| 4,544,863 A | 10/1985 | Hashimoto |
| 5,121,287 A | 6/1992 | Lee |
| 5,381,076 A | 1/1995 | Nerone |
| 5,426,350 A * | 6/1995 | Lai ..................... H05B 41/2828 |
| | | 315/209 R |
| 5,430,356 A | 7/1995 | Ference et al. |
| 5,463,286 A | 10/1995 | Daleo et al. |
| 5,661,645 A | 8/1997 | Hochstein |
| 5,783,909 A | 7/1998 | Hochstein |
| 6,011,362 A | 1/2000 | Moison |
| 6,028,776 A | 2/2000 | Ji et al. |
| 6,078,147 A | 6/2000 | Arts et al. |
| 6,093,983 A | 7/2000 | Singh |
| 6,118,231 A | 9/2000 | Geiginger et al. |
| 6,181,082 B1 | 1/2001 | Moisin |
| 6,188,163 B1 | 2/2001 | Danov |
| 6,300,727 B1 | 10/2001 | Bryde et al. |
| 6,353,545 B1 | 3/2002 | Ueda |
| 6,411,045 B1 | 6/2002 | Nerone |
| 6,545,434 B2 | 4/2003 | Sembhi et al. |
| 6,590,350 B1 * | 7/2003 | Tyson ..................... H01J 61/56 |
| | | 315/224 |
| 6,600,273 B2 | 7/2003 | Kim et al. |
| 6,842,668 B2 | 1/2005 | Carson et al. |
| 6,927,546 B2 | 8/2005 | Adamson et al. |
| 6,933,686 B1 | 8/2005 | Bishel |
| 6,954,038 B2 | 10/2005 | Ido et al. |
| 7,038,399 B2 | 5/2006 | Lys et al. |
| 7,110,269 B2 | 9/2006 | Cao et al. |
| 7,119,494 B2 | 10/2006 | Hui et al. |
| 7,312,695 B2 | 12/2007 | Lehmer et al. |
| 7,786,676 B2 | 8/2010 | Cheng et al. |
| 8,242,711 B2 | 8/2012 | Summerland et al. |
| 9,124,193 B2 * | 9/2015 | Summerland ......... H02M 7/538 |
| 2001/0022501 A1 | 9/2001 | Pilz et al. |
| 2002/0191426 A1 | 12/2002 | Hussein et al. |
| 2004/0085030 A1 | 5/2004 | Laflamme et al. |
| 2004/0264187 A1 | 12/2004 | Vanderschuit et al. |
| 2006/0002110 A1 | 1/2006 | Dowling et al. |
| 2006/0022214 A1 | 2/2006 | Morgan et al. |
| 2006/0192502 A1 | 8/2006 | Brown et al. |
| 2006/0238136 A1 | 10/2006 | Johnson, III et al. |
| 2007/0108916 A1 | 5/2007 | Wang et al. |
| 2007/0145907 A1 * | 6/2007 | Hwang ............... H05B 41/2981 |
| | | 315/224 |
| 2007/0182347 A1 | 8/2007 | Shteynberg et al. |
| 2007/0236159 A1 | 10/2007 | Beland |
| 2008/0143271 A1 | 6/2008 | Takahashi et al. |
| 2009/0066262 A1 * | 3/2009 | Tateishi ................. H02M 3/07 |
| | | 315/291 |

FOREIGN PATENT DOCUMENTS

| | | |
|---|---|---|
| EP | 1528785 | 5/2005 |
| EP | 2079278 | 7/2009 |
| GB | 2184566 | 6/1987 |
| JP | 03-233895 | 10/1991 |
| JP | 3196157 B2 | 4/1999 |
| JP | 2002272127 A | 9/2002 |
| JP | 2003-317989 | 1/2003 |
| JP | 2003-157986 | 5/2003 |
| JP | 2004273267 A | 9/2004 |
| JP | 2005-011739 | 1/2005 |
| JP | 2007-035403 | 3/2007 |
| JP | 200780771 | 3/2007 |
| JP | 2007-227155 | 6/2007 |
| JP | 2001-313424 | 9/2011 |
| WO | WO 99/45750 | 9/1999 |
| WO | WO 01/82657 | 11/2001 |
| WO | WO 03/079738 | 9/2003 |
| WO | WO 03/096761 | 11/2003 |
| WO | WO 2005/048658 A1 | 5/2005 |
| WO | WO 2006/038157 | 4/2006 |
| WO | WO 2006/060900 | 6/2006 |
| WO | WO 2006/102355 | 9/2006 |
| WO | WO 2008/056435 A1 | 5/2008 |
| WO | WO 2008/110978 | 9/2008 |
| WO | WO 2008/120019 | 10/2008 |

OTHER PUBLICATIONS

Flower and Pollock (1997) "Properties and design of series-parallel load-resonant converters: their potential in marine and marine-related applications". *Transactions on Image Processing*, 110(2): 95-118.
International Search Report of PCT/GB2010/050919 filed Jun. 1, 2010. Applicant: HoldIp Limited.
Pollock (1999) "Constant frequency, constant current load-resonant capacitor charging power supply." *IEEE Proceedings Electric Power Applications*, 146(2): 187-192.
Pollock and Flower (1996) "Series-parallel load-resonant converter for controlled-current arc welding power supply." *IEEE Proceedings Electric Power Applications*, 143(3): 211-218.
Pollock and Flower (1997) "New Method of Power control for Series-Parallel Load Resonant Converters Mainining Zero-Current Switching and Unity Power Factor Operation". *IEEE Transactions on Power Electronics*, 12(1): 103-115.
Pollock and Miti (1995) "Isolated Step up/down three-phase AC to DC power supply." *Electronics Letters*, 31(18): 1527-1529.
Pollock et al. (1997) "Load resonant converter with zero current switching and variable output power." *Electronics Letters*, 33(25): 2081-2082.
Polock (1999) "Comstant frequence, constant current load-resonant capacitor charging power supply." IEE Proceedings, 187-192.

* cited by examiner

POWER ADAPTORS

This application is a continuation application from U.S. Ser. No. 13/066,244, Improvements Relating to Power Adaptors, by David Thomas Summerland, et al., filed Apr. 8, 2011, which was a continuation application of PCT/GB2009/051334, filed Oct. 8, 2009, which claims priority and benefit of UK application 0818411.1, filed Oct. 8, 2008, UK application 0821297.9, filed Nov. 21, 2008, UK application 0822691.2, filed Dec. 12, 2008 and UK application 0909139.8, filed May 28, 2009 which are hereby incorporated by reference for all purposes.

This invention relates to power adaptors, and in particular power adaptors suitable for providing a change in effective voltage between the input and the output of the power adaptor.

In domestic applications, the voltage available from the mains supply is typically 120V-240V AC, at frequencies of 50 or 60 Hz. Where a power adaptor is adapted to drive a low voltage load, such as a 10V load, the ratio between the voltage available at the supply and the voltage required to drive the load is between 10 and 20. With such a large ratio, conventional switched-mode power adaptors used to drive low voltage loads become very inefficient because the switching operates at small duty ratios with very short conduction times and current waveforms having high peak to average ratios.

It is common therefore in prior art power adaptors to include a magnetic transformer with a turns ratio suitable to create a step down in voltage and a corresponding step up in current. In some conventional power supplies, this magnetic transformer is provided at the input to the power adaptor, such that the entire power adaptor operates at lower voltage. In such cases, the magnetic transformer operates at a supply frequency (50 or 60 Hz) and is relatively bulky and expensive. In other cases, the magnetic transformer is integrated as part of the switching circuit, allowing it to operate at the switching frequency of the electronic components in the power adaptor. Such circuits therefore have the advantage that the magnetic transformer can be made smaller.

Nevertheless, all of these prior art arrangements require a magnetic transformer, which is rather bulky and inefficient.

There has now been devised an improved power adaptor which overcomes or substantially mitigates the above-mentioned and/or other disadvantages associated with the prior art.

According to the invention, there is provided a power adaptor comprising an input for connection to an AC power supply, and a resonant circuit coupled to the input that provides an output suitable for driving a load, wherein the capacitance and inductance of the resonant circuit are selected to provide a pre-determined change in effective voltage, and a corresponding pre-determined change in effective current, between the input and the output of the power adaptor.

The power supply according to the invention is advantageous principally because the power adaptor provides a pre-determined change in effective voltage, and a corresponding pre-determined change in effective current, between the input and the output of the power adaptor, without any need for a magnetic transformer. The power adaptor may therefore be adapted to drive a low voltage load from a higher mains AC supply, without the need for a magnetic transformer, and without the need for an electronic switching circuit operating at small duty ratios (short on-times relative to switching periods) and having current waveforms with high peak to average ratios. In particular, the power adaptor may be adapted to connect to a high voltage AC mains supply (eg 110V or 230V AC, at frequencies of 50 Hz or 60 Hz), and provide an output suitable for driving a low voltage solid state light source (eg 10-20V).

The capacitance and inductance of the resonant circuit may be selected to provide a pre-determined decrease in effective voltage, and a corresponding pre-determined increase in effective current, between the input and the output of the power adaptor. Alternatively, the capacitance and inductance of the resonant circuit are selected to provide a pre-determined increase in effective voltage, and a corresponding pre-determined decrease in effective current, between the input and the output of the power adaptor.

In presently preferred embodiments, the capacitance and inductance of the resonant circuit are selected to provide a pre-determined ratio between the effective voltage at the input of the power adaptor and the effective voltage at the output of the power adaptor, and a pre-determined ratio between the effective current at the input of the power adaptor and the effective current at the output of the power adaptor.

The resonant circuit is preferably configured to provide an output having an increased or decreased effective current relative to the effective current through a resonant inductor, such that the output has a correspondingly decreased or increased effective voltage relative to the effective voltage of the power supply. The output preferably has an effective current that is increased or decreased relative to the current through the resonant inductor by a factor of at least two, and most preferably by a factor of at least five. In addition, the effective voltage decrease or increase of the output relative to the AC power supply is preferably by a factor of at least two, and most preferably by a factor of at least five.

The pre-determined changes in effective voltage and effective current between the input and the output of the power adaptor are preferably achieved with no assistance from a magnetic transformer. Indeed, the power adaptor may be devoid of any magnetic transformers, other than signal or power supply transformers, which may be present in the power adaptor.

The pre-determined changes in effective voltage and effective current between the input and the output of the power adaptor may be achieved with no assistance from a transformer. However, the power adaptor may be provided with a piezoelectric transformer that isolates the output from the input of the power adaptor. In this arrangement, the piezoelectric transformer may provide a further pre-determined change in effective voltage, and a further pre-determined change in effective current, between the input and the output of the power adaptor.

Where the power adaptor is provided with a piezoelectric transformer, the piezoelectric transformer may be arranged to provide at least some of the capacitance of the resonant circuit. In one embodiment, the piezoelectric transformer provides all of the capacitance of the resonant circuit. The inclusion of a piezoelectric transformer therefore offers several advantages when incorporated into a power adaptor having a resonant circuit. Hence, according to a further aspect of the invention, there is provided a power adaptor comprising an input for connection to an AC power supply, a resonant circuit coupled to the input that provides an output suitable for driving a load, and a piezoelectric transformer that isolates the output from the input of the power adaptor.

The output is preferably suitable for driving a constant current load, such as a solid state light source. The resonant circuit is preferably therefore configured to provide an output having a substantially constant voltage, which is pre-determined for a particular effective voltage of the AC power supply. In particular, the resonant circuit is preferably configured to either boost (ie raise) or buck (ie lower) the actual voltage received at the input of the power adaptor, in order to provide a substantially constant voltage, which is pre-determined for a particular effective voltage of the AC power supply, for the majority of the input AC cycle.

This arrangement of the present invention therefore enables the output to have a substantially constant voltage, which is pre-determined for a particular effective voltage of the AC power supply, for a greater proportion of the input AC cycle than that provided by a magnetic transformer. This arrangement therefore enables the power adaptor to have a lower bulk storage capacitance than power adaptors that utilise magnetic transformers to provide a pre-determined change in effective voltage.

This arrangement of the present invention is suitable for driving fixed loads. However, the power adaptor may also be adapted to drive variable loads. In particular, the power adaptor may be adapted to turn off the output, when the load is insufficient to be driven by the output provided by the power adaptor, and then turn on the output when the load is sufficient to be driven by the output provided by the power adaptor.

In a particularly preferred arrangement for providing an output that is suitable for driving a constant current load, the resonant circuit is an LCL series-parallel resonant circuit.

By "LCL series-parallel resonant circuit" is meant a resonant circuit comprising a first inductor and a first capacitor in series, and a parallel load leg including a second inductor. The first inductor and first capacitor are preferably connected in series between two input terminals of the resonant circuit, and the resonant circuit preferably comprises a load leg connected in parallel across the first capacitor, wherein the load leg comprises the second inductor and an output for driving the load, which are connected in series. In particular, the LCL resonant circuit preferably has input terminals and output terminals with a first inductor L1, connected from a first input terminal through a common point with second inductor L2, to a first output terminal, the second input terminal being directly connected to the second output terminal, and a capacitor C1, connected between the common point between the two inductors and the direct connections between second terminals of input and output. The input terminals are preferably adapted to be driven from a high frequency inverter. Any of the first inductor, the first capacitor and the second inductor may comprise a single inductive or capacitive component or a combination of such components.

The resonant circuit is preferably adapted such that at one of its resonant frequencies, the power adaptor provides a constant current output, at a given effective input voltage, and the resonant circuit is preferably driven at that resonant frequency or a sub-harmonic thereof, or sufficiently near to that resonant frequency or a sub-harmonic thereof for the power adaptor to be suitable for use with a constant current load, such as a solid state light source. In particular, the first and second inductors are preferably selected such that the reactance $X_{L1}$ of the first inductor and the reactance $X_{L2}$ of the second inductor are substantially equal in magnitude, and are substantially equal in magnitude to the reactance $X_{C1}$ of the first capacitor. In particular, $X_{L1} \approx X_{L2} \approx -X_{C1}$ in presently preferred embodiments.

When the chosen components satisfy these conditions, at a given input voltage, the current delivered to a load will be constant, independent of the load connected to the power adapter. Furthermore, variation of the input voltage would directly control the magnitude of the constant current delivered to the load. When driving a constant voltage load, such as LEDs, the power delivered to the load would therefore be directly proportional to the input voltage, without requiring any feedforward or feedback control.

Where the LCL series-parallel resonant circuit is adapted to provide a constant current output, the capacitance of the LCL series-parallel resonant circuit is preferably selected with a reactance $X_{C1}$ to match a required load resistance $R_L$ and a required, relatively higher, input resistance $R_{in}$ for the resonant circuit. The first capacitor is preferably selected using the following equation:

$$X_{C1} = \sqrt{R_{in} R_L} \qquad (1)$$

where $X_{C1}$ is the reactance of the first capacitor. The reactance of the first capacitor is preferably therefore equal to the square-root of the product of the required load resistance $R_L$ and the required input resistance $R_{in}$ for the resonant circuit.

The output of the power adaptor is preferably therefore adapted to be connected to a load of apparent impedance $R_L$ the value of the first and second inductors, and the first capacitor, L1, L2 and C1, being chosen such that at least one frequency, the reactances of L1, L2 and C1 are approximately similar in magnitude and that at least one frequency the apparent impedance seen at the input terminals $R_{in}$ is transformed by the LCL resonant circuit to be approximately equal to the square of the reactance of the capacitor $X_{C1}$ divided by the apparent impedance of the load, $R_L$.

This selection of the inductance and capacitance of the resonant circuit therefore provides a pre-determined change in effective voltage between the input and the output of the power adaptor.

In presently preferred embodiments, the power adaptor according to the invention comprises an input for connection to a mains AC power supply, and the resonant circuit provides an output suitable for driving a solid state light source. As discussed above, the resonant circuit is preferably an LCL series-parallel resonant circuit.

The use of an LCL series-parallel resonant circuit is particularly advantageous when the power adaptor is adapted to provide an output suitable for driving a solid state light source. In particular, the LCL series-parallel resonant circuit may be adapted to provide a constant current output suitable for driving a solid state light source, which is not dependent upon the load, and does not require any form of feedback or complex control. A power adaptor including an LCL series-parallel resonant circuit may therefore provide a much more efficient transfer of power from the mains power supply to the solid state light source, in comparison to prior art power adaptors, and the power adaptor may be more compact and have a lower manufacturing cost than prior art adaptors. In addition, the power at the output of the power adaptor would typically reduce as the input power reduces, and hence a power adaptor including an LCL series-parallel resonant circuit is suitable for use with conventional power reducing devices associated with the mains power supply. Hence, according to a further aspect of the invention, there is provided a power adaptor for a solid state light source, the power adaptor comprising an input for connection to a mains power supply, and an LCL series-parallel resonant circuit coupled to the input that provides an output suitable for driving the solid state light source.

The resonant circuit is preferably adapted to provide, at a given input voltage, a constant current output. The power delivered to the output preferably therefore varies with variation of the voltage at the input, with no need for any control. In particular, the magnitude of the constant current is preferably proportional to the input voltage. Furthermore, the resonant circuit is preferably adapted to provide, at a given input voltage, a constant current output that is independent of the load. In order to achieve these characteristics, the resonant circuit is preferably adapted such that one of its resonant frequencies provides these properties, and the resonant circuit is preferably driven at that resonant frequency, or sufficiently near to that resonant frequency for the power adaptor to be suitable for use with a solid state light source.

Nevertheless, it has been found that by driving the resonant circuit at a sub-harmonic of the resonant frequency, the power factor and/or efficiency of the power adaptor may be improved. Most preferably, the resonant circuit is driven at a sub-harmonic of 1/x, where x is an odd number, for example, 1/3, 1/5 or 1/7. Driving the resonant circuit at a sub-harmonic of the resonant frequency has the advantage that the switching frequency and switching losses of the resonance drive circuit may be reduced, thereby improving the efficiency of the power adaptor. In most prior art resonant circuits, driving the circuit at a sub-harmonic would reduce the power. However, the LCL series-parallel resonant circuit may be adapted to have one of its resonant frequencies at 0 Hz, as discussed in more detail below, which allows low frequency currents to pass through to the load. Hence, the current passing through the resonant circuit and the power delivered to the load does not change substantially if the circuit is driven at a sub-harmonic of the resonant frequency.

The LCL series-parallel circuit maybe adapted to have three resonant frequencies, a first resonant frequency at 0 Hz, ie DC current, a second resonant frequency that provides, at a given input voltage, a constant current output that is independent of the load, and a third resonant frequency that provides, at a given input voltage, a current that varies with load. These resonant frequencies are preferably achieved by selecting the first inductor, the second inductor and the first capacitor, such that the reactances of those components are substantially equal. The third resonant frequency may be adapted to provide a significantly greater power at the output, relative to the second resonant frequency. A controller of the power adaptor may therefore be adapted to switch between the different resonant frequencies in order to utilise their different characteristics. For example, a controller of the power adaptor may be adapted to switch between the second and third resonant frequencies to compensate for a change of input voltage, eg between 230V and 110V AC. Further examples of such control include loading a TRIAC in the lighting system at critical points, and altering the power factor and/or regulation of the power adaptor.

As the voltage at the input varies sinusoidally, the current drawn from the input by an LCL series-parallel resonant circuit, configured as described above, will inherently follow a square shape. However, the waveform of the current drawn from the input by the resonant circuit may be modified by a controller of the power adaptor. The power adaptor may therefore include a controller adapted to determine the waveform of the current drawn from the input by the resonant circuit. In particular, the controller may be adapted to modify the waveform of the current that would inherently be drawn by the resonant circuit, such that the waveform of the current drawn from the input is more similar in shape to the waveform of the voltage at the input. In particular, the current drawn by the resonant circuit may have a waveform that is generally sinusoidal, but with flattened peaks.

The resonant circuit is preferably driven by a resonance drive circuit, which provides a resonance drive signal to the resonant circuit. The resonance drive signal is preferably an alternating signal, and is preferably provided by an oscillator that may control two or four electronic switches, eg FETs. The resonance drive signal typically has the form of a square wave. The purpose of the drive circuit is to excite the resonant circuit with an alternating voltage, the alternating voltage typically consisting of blocks of positive and negative voltage. The electronic switches are typically connected together in the form of a full bridge inverter (4 switches) or a half bridge inverter (2 switches).

As discussed above, the power adaptor may be adapted to modify the waveform of the current that would inherently be drawn by the resonant circuit, and in particular modify the shape and/or size of that waveform. In particular, a resonance drive signal may be provided to the resonant circuit, wherein the resonance drive signal is adapted to determine the desired input current waveform. For instance, the resonance drive signal may be adapted in a variety of ways including, but not limited to, any of the following including combinations thereof: (i) introducing a dead-band between half-cycles or full cycles of the alternating drive signal, (ii) varying the frequency of the drive signal, and (iii) missing cycles of the alternating drive signal.

Where the resonance drive signal is adapted by missing cycles of the alternating drive signal, these missing cycles may be arranged in a discontinuous arrangement, in a single continuous group, or in a plurality of continuous groups, for each mains supply cycle. Where the missing cycles are arranged in a plurality of continuous groups, the number of continuous groups for each mains supply cycle is preferably selected to be appropriate for the output power, and hence may be variable with the output power.

As discussed below, the power adaptor may be adapted to control the light output from the solid state light source. In this embodiment, the resonance drive signal is preferably variable, for example by a controller, in order to determine the light output from the solid state light source. The resonance drive signal is preferably also adapted to optimise the power factor and/or efficiency of the power adaptor.

Alternatively, where the power adaptor is configured such that the light output from the solid state light source is only controllable by varying the power available at the input of the power adaptor, the resonance drive signal may be predetermined, preferably to optimise the power factor and/or efficiency of the power adaptor.

Any controller of the power adaptor, as discussed above, is preferably adapted to control the resonant drive signal provided to the resonant circuit, in order to determine the waveform of the current drawn from the input by the resonant circuit. This controller of the power adaptor may be provided by an integrated circuit, such as a microprocessor, an analogue electronic circuit, or any combination of analogue and digital electronics. Indeed, the controller of the power adaptor may be an application specific, integrated circuit, which may be manufactured at very low cost. In this configuration, the oscillator of the drive circuit may also form part of the integrated circuit, or may be a separate circuit.

The determination of the frequency at which the resonant circuit is driven may be used to calibrate the power adaptor for improved efficiency. Alternatively, the frequency at which the resonant circuit is driven may be varied during use, in order to vary the power being supplied to the solid state light source.

The output for driving the solid state light source may be isolated from the resonant circuit, particularly for applications in which users would have access to the solid state light source and/or associated circuitry. In this case, the power adaptor preferably comprises a piezoelectric transformer to provide this isolation.

The resonant circuit may also include a pair of potential dividing capacitors, to which the first capacitor is connected. Alternatively, where the resonance drive circuit contains four electronic switches (eg FETs) arranged to create two switching legs (eg a "H-bridge"), as a single phase inverter, the pair of capacitors could be replaced by a single capacitor. These capacitors are preferably Y capacitors.

In another embodiment, the resonance drive circuit comprises two electronic switches (eg FETs) connected between the LCL series-parallel resonant circuit and ground, ie two "low-side" switches. These two low-side switches preferably each alternate between ON and OFF, which a first switch being ON whilst a second switch is OFF, and vice versa. This arrangement is particularly advantageous where the switches are driven by a low voltage controller, such as an integrated circuit.

In this embodiment, the first resonant inductor of the LCL series-parallel resonant circuit preferably comprises two inductors, one connected to one end of the first capacitor, and the other connected to the other end of the first capacitor. In this arrangement, one of these two inductors will be active in the positive half cycle of the supply, and the other of these two inductors will be active in the negative half cycle of the supply. In one embodiment, these two inductors are wound about a common core, such that the first resonant inductor of the LCL series-parallel resonant circuit is a three terminal inductor.

The power adaptor may draw current from the input as a function of the voltage at the input in order that the power adaptor appears as a resistive load to the mains supply. This is preferably achieved by: (i) minimising the capacitance at the input of the power adaptor, (ii) drawing a current waveform from the input that is substantially in phase with the voltage waveform at the input, and/or (iii) drawing current that is substantially proportional to the voltage. These features reduce current distortion and harmonic currents drawn from the mains supply, and increase the efficiency and power factor of the power adaptor by removing the capacitive load presented to the mains supply. Indeed, these features enable the power adaptor and connected solid state light source to be presented to the mains supply as a conventional filament light source.

Alternatively, the power adaptor may draw power from the input as a function of the voltage at the input, such that the power adaptor does not appear as a resistive load to the mains supply.

The solid state light source is preferably a Light Emitting Diode (LED), or a series of two or more LEDs. The power adaptor preferably includes one or more diodes at its output, eg a diode bridge, to ensure that no reverse currents are present that could damage the solid state light source.

Any control circuitry of the power adaptor may be powered by an integrated power supply. Alternatively, the control circuitry of the power adaptor may be powered by a connection to one of the inductors of the resonant circuit, for instance a connection to a winding coupled to that inductor.

Where the power adaptor includes an integrated power supply, the integrated power supply preferably draws power directly from the mains power supply, most preferably via the input of the power adaptor. In particular, the integrated power supply is preferably a constant current power supply, such as a switch mode constant current regulator, which preferably does not cause excessive inrush and is low in cost. The control circuitry is preferably adapted to shut itself down during the off periods of a mains cycle, for example when the power adaptor is connected to a TRIAC or similar device, so that the constant current device can be low in power and hence the efficiency high.

The power adaptor preferably also includes a fault detection circuit that disables the resonant circuit, preferably by removing the oscillating drive signal, in the event that the load is removed, which may be caused by failure or disconnection of the light source, for example. The fault detection circuit preferably connects an output of the resonant circuit with the controller. This fault detection circuit is a feedback circuit, but it preferably draws minimal power from the output of the resonant circuit during normal operation, and hence should not be confused with an active feedback circuit that regulates the power output. The fault detection circuit would be active during a fault condition only, and is not essential for controlling the output power during normal use.

The power adaptor may include a filter at its input for reducing harmonic currents drawn from the mains supply. The filter may comprise a small non-electrolytic capacitor-inductor network. The power adaptor preferably also includes a rectifier at its input that converts the input waveform to one of constant polarity. Most preferably, the rectifier is a full wave rectifier that reverses the negative (or positive) portions of the alternating current waveform. Nevertheless, there is no need for the power adaptor to provide a steady DC signal at the input of the LCL series-parallel resonant circuit, and hence a bulk storage capacitor (also known as a reservoir capacitor or smoothing capacitor) is preferably not provided between the input of the power adaptor and the LCL series-parallel resonant circuit. Hence, the power adaptor is preferably substantially free of bulk storage capacitance between the input of the power adaptor and the resonant circuit. Indeed, the power adaptor is preferably substantially free of electrolytic capacitors. This enables the supply to be designed with minimal reactance, minimal inrush current, and long life with reduced size and cost relative to prior art power adaptors for solid state lighting systems. A bulk storage capacitor may be provided at the output of the power adaptor, but this is not essential for the functioning of the power adaptor with a conventional solid state light source.

The power adaptor according to the invention is preferably suitable for use in a lighting system that utilises any power reducing device for determining the power available at the input of the power adaptor. In particular, the power reducing device may be a variable resistor, such as a Variac, or a rheostat. The power adaptor may also be adapted to function in lighting systems that include a dimmer control utilising SCR phase control or a triac in order to reduce the power available at the input of the power adaptor. In this case, however, the power adaptor may be adapted to draw a minimum current from the mains supply to keep the SCR stable during the full mains cycle, unless the lighting unit is switched off, to ensure the continued functioning of the dimmer control.

A further advantage of the power adaptor according to the invention is that no monitoring of the voltage at the input, for example by a controller of the power adaptor, is necessary. Hence, the power adaptor according the invention may be devoid of any means for monitoring the voltage at the input, and in particular the power adaptor may be adapted such that the controller does not receive a signal from the input.

The power adapter may include a controller able to deliver a control signal to the resonant circuit for reducing power drawn from the input. However, in other embodiments, the power adaptor does not include a controller having such a feature. In particular, the power adaptor may be adapted so that the light output from the solid state light source is only controllable by varying the power available at the input of the power adaptor. In particular, the power available at the input of the power adaptor may be varied using an external device, such as an external power reducing device, associated with the mains supply. This embodiment is particularly suitable for use with a lighting unit including an integral power adaptor, which would be suitable for incorporation into a conventional lighting circuit. In order to maximise the efficiency of the power adaptor, the power adaptor is preferably adapted to transfer all power available at the input, save for unavoidable losses, to the output of the power adaptor.

According to a further aspect of the invention, there is provided a lighting system comprising a power adaptor as described above and a lighting unit including at least one solid state light source.

The lighting unit will typically be provided with a plurality of solid state light sources. In order to achieve different colours of light output, the lighting unit may include solid state light sources that emit light of different colours, for example LEDs that emit light of red, green and blue colour. Furthermore, the lighting unit may also include LEDs of amber, cyan and white colour in order to raise the colour rendering index.

The power adaptor and the lighting unit may have a common housing, or may be housed separately. Indeed, the power adaptor may be adapted to provide power to a plurality of lighting units, each lighting unit including a plurality of solid state light sources. Furthermore, the lighting system may include a plurality of such power adaptors. The lighting system may also include a power reducing device, such as a variable resistor, a rheostat or a dimmer control that utilises SCR phase control.

The power adaptor according to the invention is particularly suitable for use with a lighting unit including an integral power adaptor, which would be suitable for incorporation into a conventional lighting circuit. Hence, according to a further aspect of the invention, there is provided a lighting unit suitable for direct connection to a mains supply, the lighting unit comprising a power adaptor as described above and one or more solid state light sources, in which the light output from the one or more solid state light sources is controllable by varying the power available at the input of the power adaptor. In order to maximise the efficiency of the power adaptor, the power adaptor is preferably adapted to transfer all power available at the input, save for unavoidable losses, to the output of the power adaptor.

The lighting unit preferably comprises a housing for accommodating the power adaptor and the one or more solid state light sources, and a connector for connecting the input of the power adaptor to the mains supply. The connector is preferably adapted to connect to a fitting for a conventional filament light bulb. In particular, the lighting unit may include a bayonet or threaded connector. In one embodiment, the light output from the one or more solid state light sources is only controllable by varying the power available at the input of the power adaptor.

According to a further aspect of the invention, there is provided an electronic impedance matching circuit incorporating an LCL resonant circuit with input terminals and output terminals with a first inductor L1, connected from a first input terminal through a common point with second inductor L2, to a first output terminal, the second input terminal being directly connected to the second output terminal, and a capacitor C1, connected between the common point between the two inductors and the direct connections between second terminals of input and output, the input terminals being driven from a high frequency inverter, the output terminals being connected to a load of apparent impedance RL, the value of the components L1, L2 and C1 being chosen such that at least one frequency, the reactances of L1, L2 and C1 are approximately similar in magnitude and that at least one frequency the apparent impedance seen at the input terminals is transformed by the LCL resonant circuit to be approximately equal to the square of the reactance of the capacitor divided by the apparent impedance of the load, RL.

The frequency of operation of the high frequency inverter is preferably close to the frequency where the reactances of L1, L2 and C1 are approximately similar.

The electronic impedance matching circuit is preferably adapted to drive one or more LEDs with a voltage requirement which is substantially lower than the input supply voltage.

Alternatively, however, the electronic impedance matching circuit may be adapted to charge a battery with a voltage requirement which is substantially lower than the input supply voltage, or may be adapted to drive an electric motor at more than one speed by dynamically matching the varying apparent load impedance to the supply voltage.

A preferred embodiment of the invention will now be described in greater detail, by way of illustration only, with reference to the accompanying drawings, in which FIG. 1 is a schematic diagram of a power adaptor according to the invention;

Figure 1:
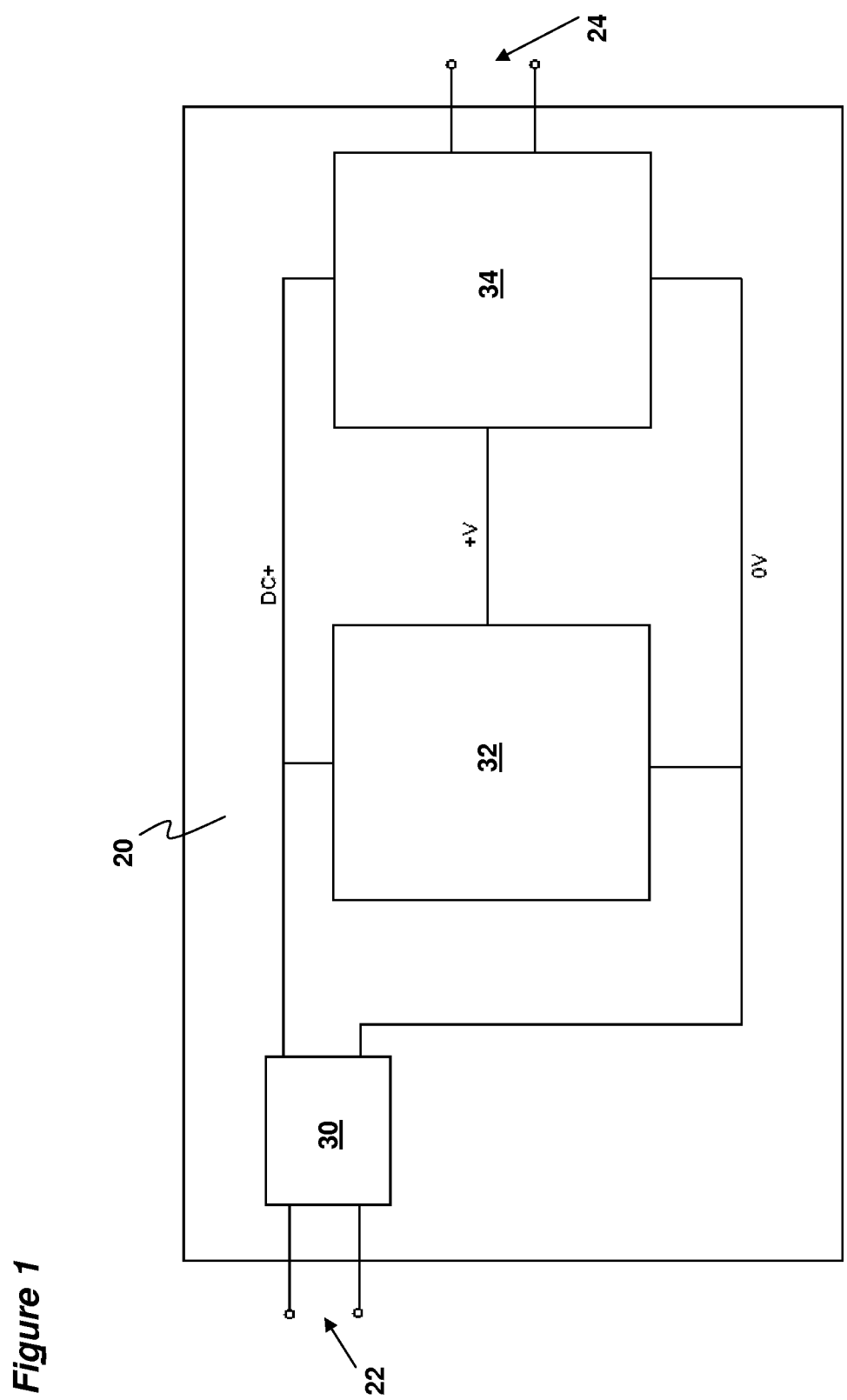

FIG. 1 shows a power adaptor 20 according to the invention. The power adaptor 20 comprises an input 22 for drawing electrical power from the mains circuit, and an output 24 for providing electrical power to the three LEDs 60a,60b,60c of the solid state lighting unit 50. The power adaptor 20 includes a filtering and rectifying circuit 30 at the input 22, such that the AC voltage waveform drawn from the mains circuit is supplied to the remainder of the power adaptor circuitry as a full-wave rectified waveform (DC+).

The power adaptor 20 also includes a low power, auxiliary power supply 32, and a resonant circuit 34 including a resonance controller 40 and a resonance drive circuit 42, which are described in more detail below with reference to FIG. 2. The low power, auxiliary power supply 32 provides a low power DC output (+V) for powering the integrated circuits of the resonance controller 40 and the resonance drive circuit 42. This provides a stable power supply to the integrated circuits of the power adaptor to ensure stable functioning of those circuits. It is noted that in other embodiments, the integrated circuits of the power adaptor are powered by connections to additional windings coupled to one of the inductors of the resonant circuit, and hence the auxiliary power supply 32 is omitted.

Figure 2:
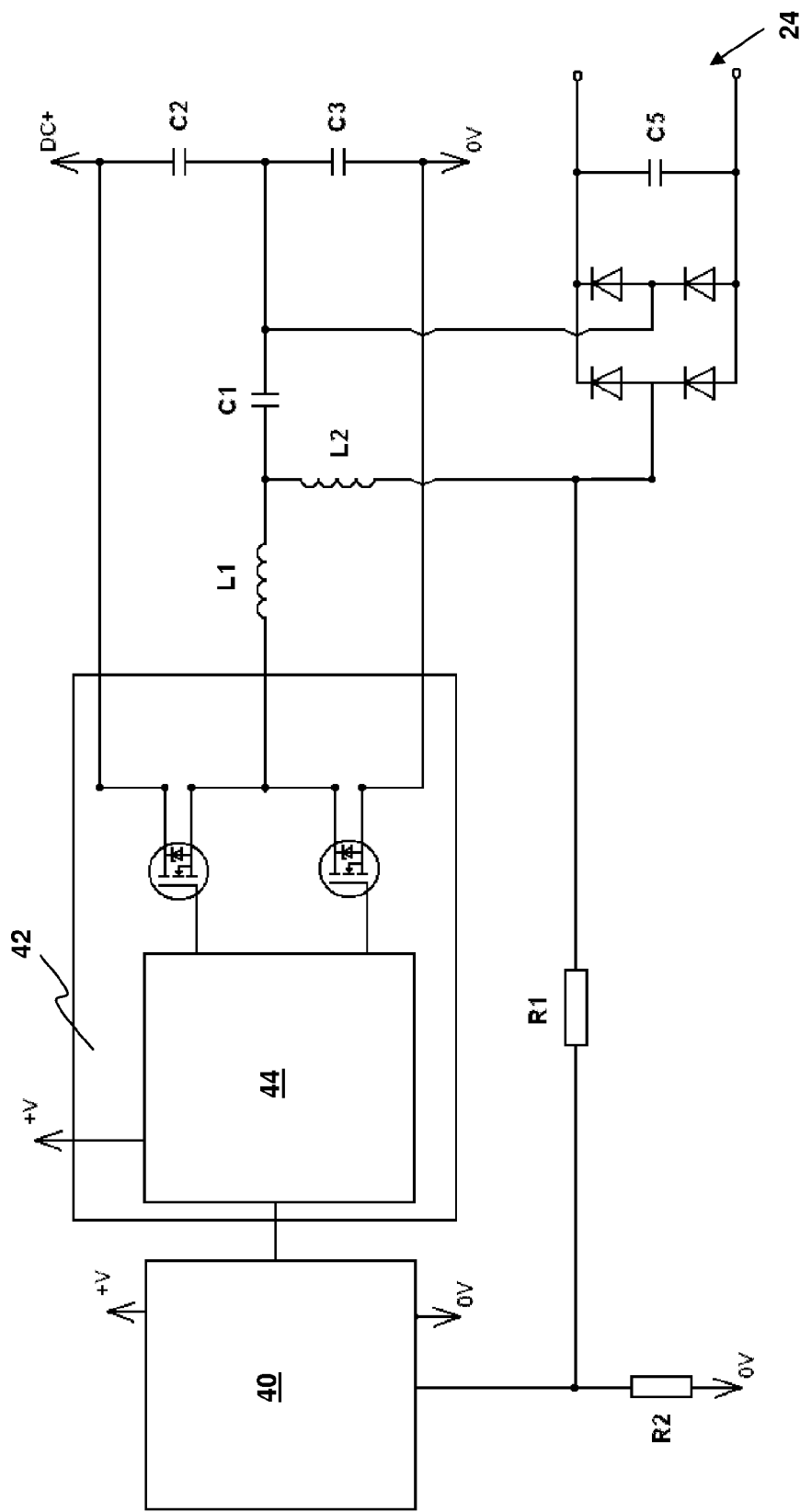
FIG. 2 is a schematic diagram of a resonant circuit, including a resonance controller and a resonance drive circuit, that forms part of the power adaptor of FIG. 1.

The resonant circuit 34, including the resonance controller 40 and the resonance drive circuit 42, is shown in FIG. 2. The resonance controller 40 includes a control circuit and is adapted to control the resonance drive circuit 42. In particular, the resonance controller 40 has an output for supplying a control signal to the resonance drive circuit 42, which determines the form of the current drawn from the input by the resonant circuit 34. It is noted that in other embodiments, the resonance drive circuit 42 is self-oscillating, and the control circuit is omitted altogether.

The resonant circuit 34 has the form of an LCL series-parallel resonant circuit (L1, C1 and L2). The resonance drive circuit 42 is adapted to drive the LCL series-parallel resonant circuit with a square wave driving signal. This square wave signal is generated by two electronic switches, eg FETs, connected to a first end of the resonant circuit, and associated drive circuitry 44. The FETs are controlled by the resonance controller 40. The output of the resonant circuit 34 is rectified using a diode bridge, and then smoothed by a capacitor (C5) at the output of the rectifier, so as to form an output suitable for driving the LEDs 60a,60b,60c. The capacitors C2 and C3 create a connection point for the second end of the resonant circuit, substantially midway in voltage between DC+ and 0V.

Figure 3:
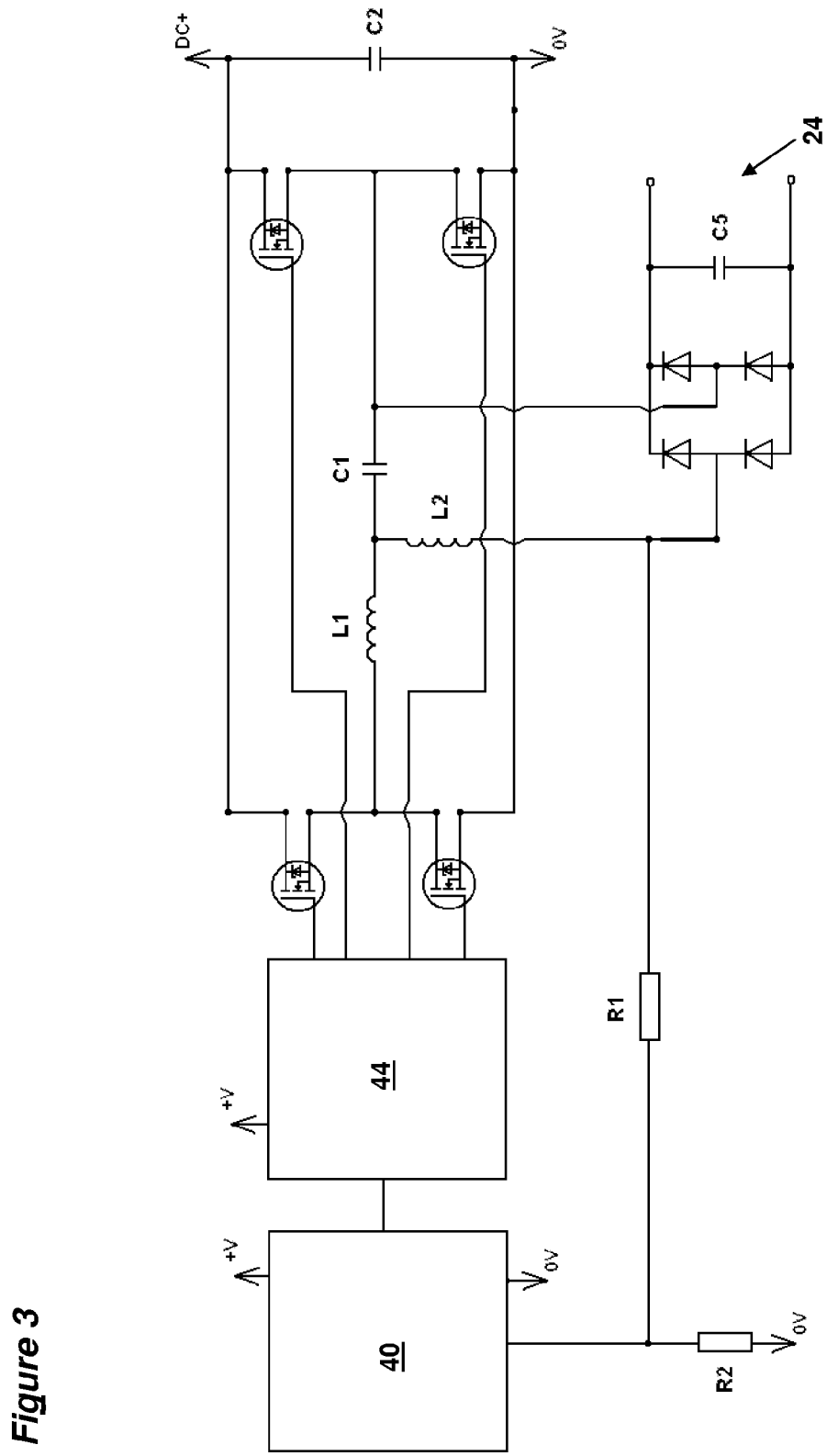
FIG. 3 is a schematic diagram of the resonant circuit of FIG. 2, including an alternative resonant drive circuit.

Alternatively, the resonance drive circuit 42 contains four electronic switches (eg FETs) arranged to create two switching legs (in a "H-bridge"), as a single phase inverter, as illustrated in FIG. 3. In this embodiment, the capacitors C2 and C3 have been replaced by a capacitor (C2) connected between DC+ and 0V. The circuit cannot operate with no capacitance across the DC supply, as a small amount of capacitance is required to protect the switches from overvoltage damage during switching transients.

The LCL series-parallel resonant circuit is configured such that at a chosen frequency, the reactance of L1 ($X_{L1}$), the reactance of C1 ($X_{C1}$) and the reactance of L2 ($X_{L2}$) are substantially equal. In this configuration, the LCL series-parallel resonant circuit has two non-zero resonant frequencies. The frequency at which the reactances are equivalent will be one of the two non-zero resonant frequencies. When driving the resonant circuit at this frequency, the resonant circuit supplies a constant current to the output, and hence to the LEDs 60a,60b,60c, regardless of the load. The magnitude of the constant current is proportional to the input voltage. This resonant frequency is $$\omega_1 = +\frac{1}{\sqrt{L_S C_P}} \quad (2)$$

The resonance controller 40 and the resonance drive circuit 42 is therefore adapted to excite the LCL series-parallel resonant circuit close to this resonant frequency, $\omega_1$. As a consequence of driving the resonant circuit close to the resonant frequency, the switching losses in the electronic switches are reduced, and hence the efficiency of the circuit is improved. Further advantages include the reduction of conducted and radiated electromagnetic interference, and hence the reduction of the expense of necessary filtering and screening components.

The normal characteristic of this configuration of the LCL series-parallel resonant circuit is to draw a power which is directly related to input voltage. Without any control, as the voltage at the input 22 varies sinusoidally, the AC current drawn from the input 22 would follow a square shape. However, it is possible to use the on-time modulation and/or the frequency of the switches to reduce the power drawn from the input 22 in the proximity of each zero crossing, and therefore to improve the input current harmonics. In addition, the optional capacitor (C5) on the output of the rectifier smoothes the power delivered to the LED such that the light output will contain less fluctuation.

A fault detection circuit is preferably provided that includes a connection between the output of the LCL series-parallel resonant circuit and a disable pin on the PIC of the resonance controller 40, through resistor R1, and a connection with 0V through resistor R2. The fault detection circuit draws minimal power. However, in the event that an LED 60a,60b,60c stops conducting, the associated fault detection circuit quickly detects a rise in voltage at the output of the resonant circuit and causes the resonance controller 40 to shut-off its output to the resonance drive circuit 42, and hence cause the drive signal to be removed from the resonant circuit 34. In FIG. 2, the fault detection circuit is shown connected between L2 and the diode bridge. However, please note that this circuit could also be connected between the positive end of the diode bridge and the positive terminal of the output 24.

The amount of power delivered to the LEDs 60a,60b,60c can be varied with the variation of the input mains supply voltage, which makes it suitable for use with a power reducing device 10.

Figure 4:
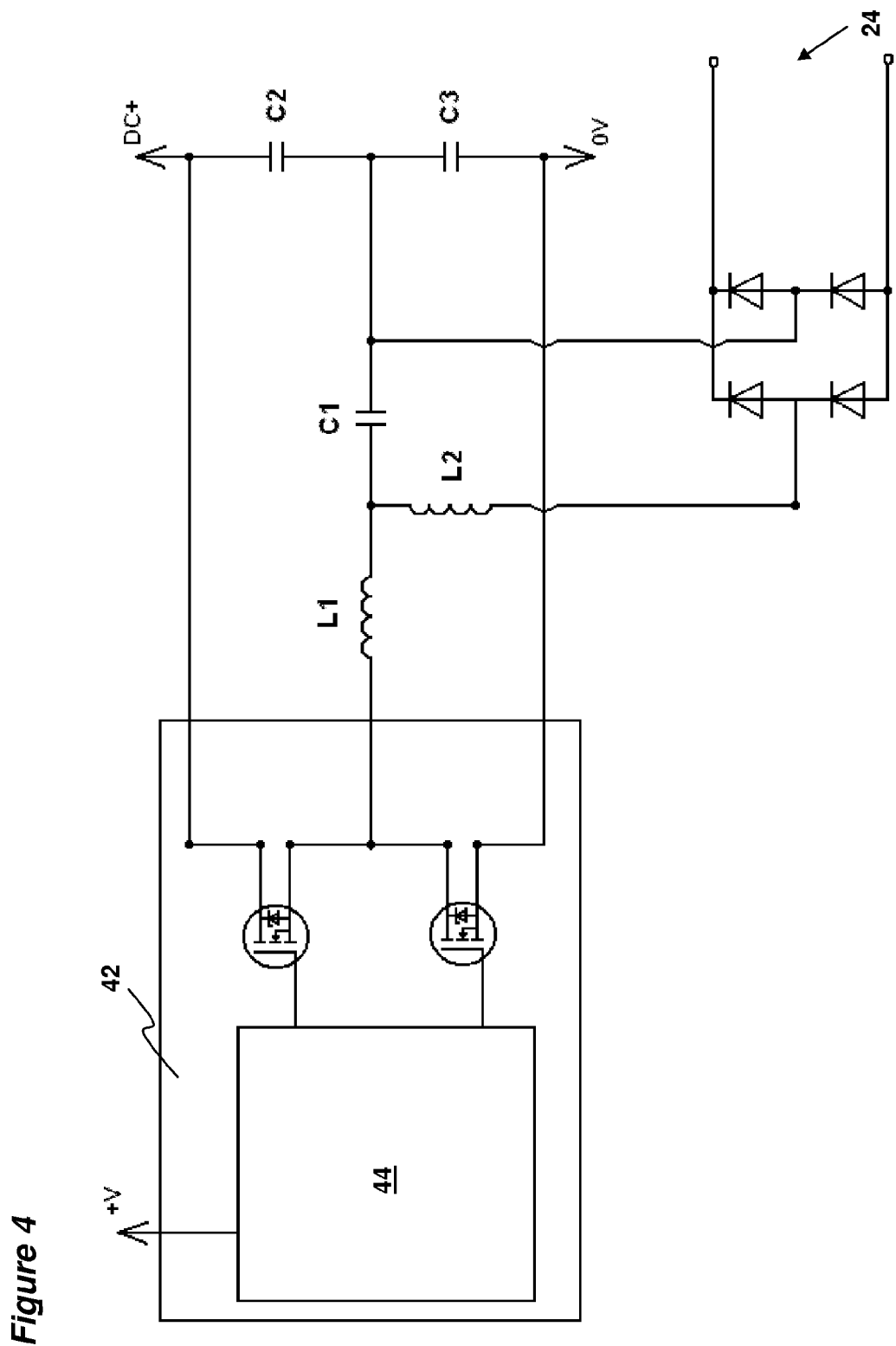
FIG. 4 is a schematic diagram of a second alternative to the circuit shown in FIG. 2.

FIG. 4 shows a further alternative to the circuit shown in FIG. 2, in which the resonance controller 40 has been omitted. In this embodiment, the resonance drive circuit 42 consists simply of two electronic switches, eg FETs, connected to a first end of the resonant circuit, and associated drive circuitry 44 that is any form of analogue or digital circuit capable of providing a suitable drive signal to the electronic switches. Furthermore, this embodiment does not include any fault detection circuit (R1 and R2 in FIGS. 2 and 3), or any capacitor (C5 FIGS. 2 and 3) at the output of the rectifier.

The power adaptors described above in relation to FIGS. 1-4 are each adapted to connect to a high voltage power supply (eg 110V or 230V AC, at frequencies of 50 Hz or 60 Hz), and provide an output suitable for driving a low voltage load, such as a solid state light source (eg 10-20V). In particular, the LCL series-parallel resonant circuit of each power adaptor is adapted to provide an output having a significantly decreased voltage, and a significantly increased current, relative to the power supply, without any need for a magnetic transformer.

The LCL series-parallel resonant circuits of the power adaptor described in relation to FIGS. 1-4 each have a first terminal and second terminal connected to a full bridge inverter with four switching devices or a half bridge inverter with two switching devices and voltage dividing capacitors. A first inductor L1, and first capacitor C1 are connected in series from the first terminal to the second terminal. The load leg of the circuit is connected in parallel with the first capacitor C1, the load leg comprising a second inductor L2 in series with a rectifying means to supply unidirectional current to the load while current in the resonant circuit alternates at high frequency.

In such a circuit, the voltage across the first capacitor C1 determines the current which is driven through the load leg. It would be expected therefore that if the reactance of the first inductor L1 was increased, a greater voltage would be dropped across that component and the voltage across the load leg would be more closely matched to the lower voltage required.

It has been discovered that this is not the case, but it is possible to choose values for the resonant components L1, L2 and C1 such that the current in the load leg is significantly higher than the current in the first inductor L1.

The current in the load leg of this circuit at any frequency is given by:

$$i_{L2} = \frac{X_{C1}V}{R_L X_{L1} + R_L X_{C1} + j(X_{L1}X_{C1} + X_{L2}X_{L1} + X_{L2}X_{C1})} \quad (3)$$

Where $X_{L1}$, $X_{L2}$, $X_{C1}$ are the reactances of the resonant components L1, L2 and C1, respectively, V is the excitation voltage, $R_L$ is the effective resistance of the load and j is the reactive component.

When $X_{L1}=X_{L2}=-X_{C1}$ the above equation simplifies to $$i_{L2} = \frac{V}{-j(X_{C1})} \quad (4)$$

In this configuration, the current in the load is independent of the load, and is proportional to the input supply voltage.

The further step of decreasing $X_{C1}$ results in an increase in the load current for the same voltage. However, a surprising aspect of this invention is that at resonance, the input resistance of the circuit is $$R_{in} = \frac{X_{C1}^2}{R_L} \quad (5)$$

Rearranging, $$X_{C1} = \sqrt{R_{in}R_L} \quad (6)$$

Hence it is possible to choose a value of $X_{C1}$ to match a given load $R_L$ to a required (higher) value of $R_{in}$ such that the current drawn at the input is small and the current delivered to the load is high.

Thus, this embodiment of the invention can drive a low voltage LED string from a higher voltage supply by correct choice of capacitors and inductors. The circuit also benefits from the constant current aspects of this circuit.

As an example an LED string of forward voltage 12V with a current requirement of 1 A is to be driven from a 230V AC power supply. The apparent resistance of the load $R_L$ is 12Ω. The power of the load is 12 W so the power of the input (assuming no losses) is 12 W. If the half bridge inverter with split capacitors is used to drive the resonant circuit, the effective voltage applied on the resonant circuit is ±115V. The required input resistance is therefore approximately 1100Ω. The value of $X_{C1}$ is therefore 115Ω, which corresponds to a capacitance of 20 nF at a frequency of 70 kHz. The corresponding values of $L_1$ and $L_2$ would be 260 µH.

Figure 5:
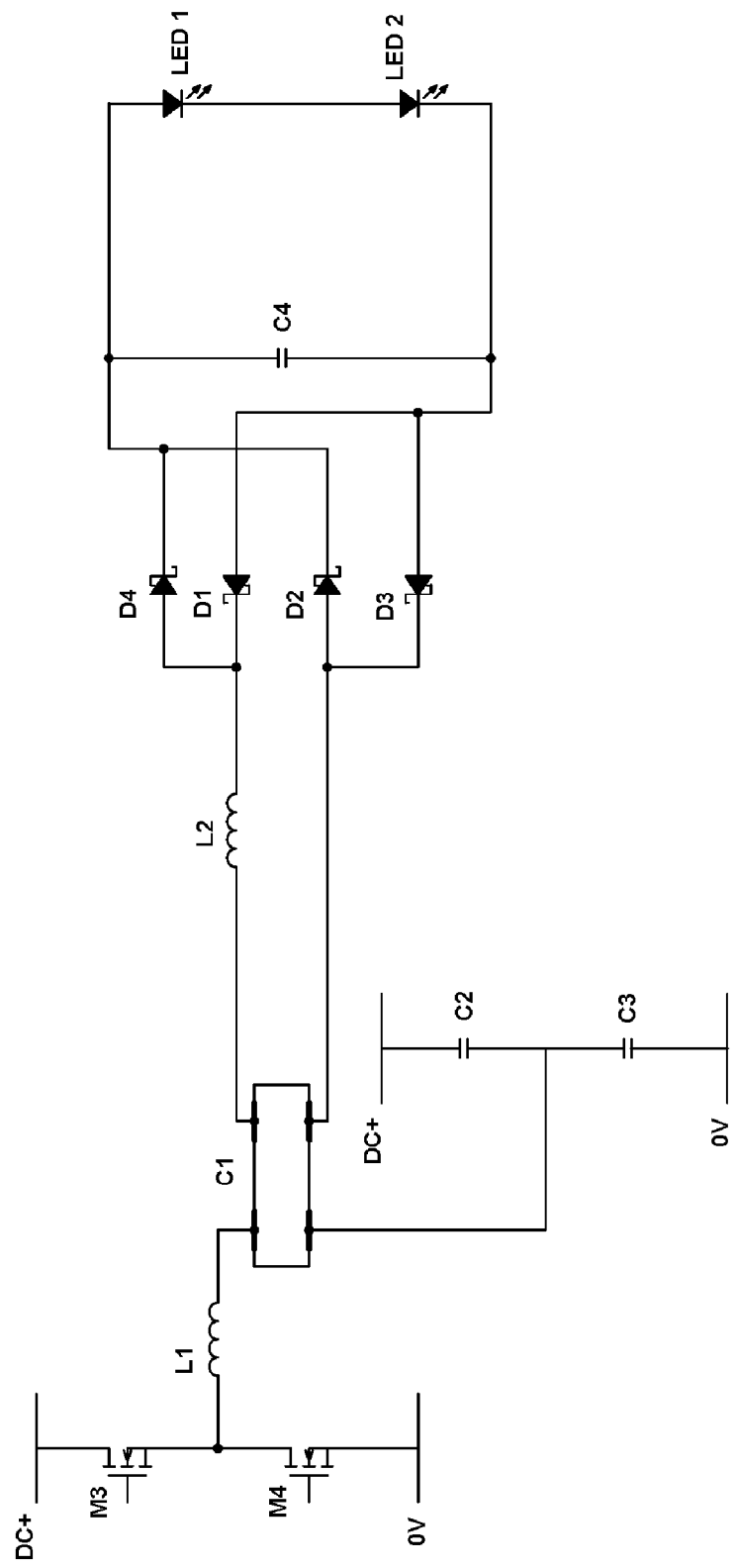
FIG. 5 is a schematic diagram of a third alternative to the circuit shown in FIG. 2.

A further embodiment of the power adaptor according to invention is shown in FIG. 5. This embodiment is similar to the previous embodiments, in that it comprises a half-bridge inverter (M1, M2), an LCL series-parallel resonant circuit (L1, C1, L2), a pair of potential-dividing capacitors (C2, C3), and a schottky diode bridge (D1-D4) and a capacitor (C4) at its output. The output is connected to one or more LEDS (two LEDs, LED 1 and LED 2, are shown in FIG. 5), which are connected in series.

However, this embodiment differs from the previous embodiments in that the capacitor (C1) of the LCL series-parallel resonant circuit is defined by a piezoelectric transformer. The piezoelectric transformer comprises four piezoelectric transformer elements, which are formed of a ceramic material, such as PZT (lead zirconate titanate).

The LCL series-parallel resonant circuit including the piezoelectric transformer is adapted to provide an output having a significantly decreased voltage, and a significantly increased current, relative to the power supply. In particular, the power adaptor is adapted to connect to a high voltage power supply (eg 110V or 230V AC, at frequencies of 50 Hz or 60 Hz), and provide an output suitable for driving a low voltage solid state light source (eg 10-20V).

The piezoelectric transformer also isolates the output of the power adaptor from the input of the power adaptor.

Figure 6:
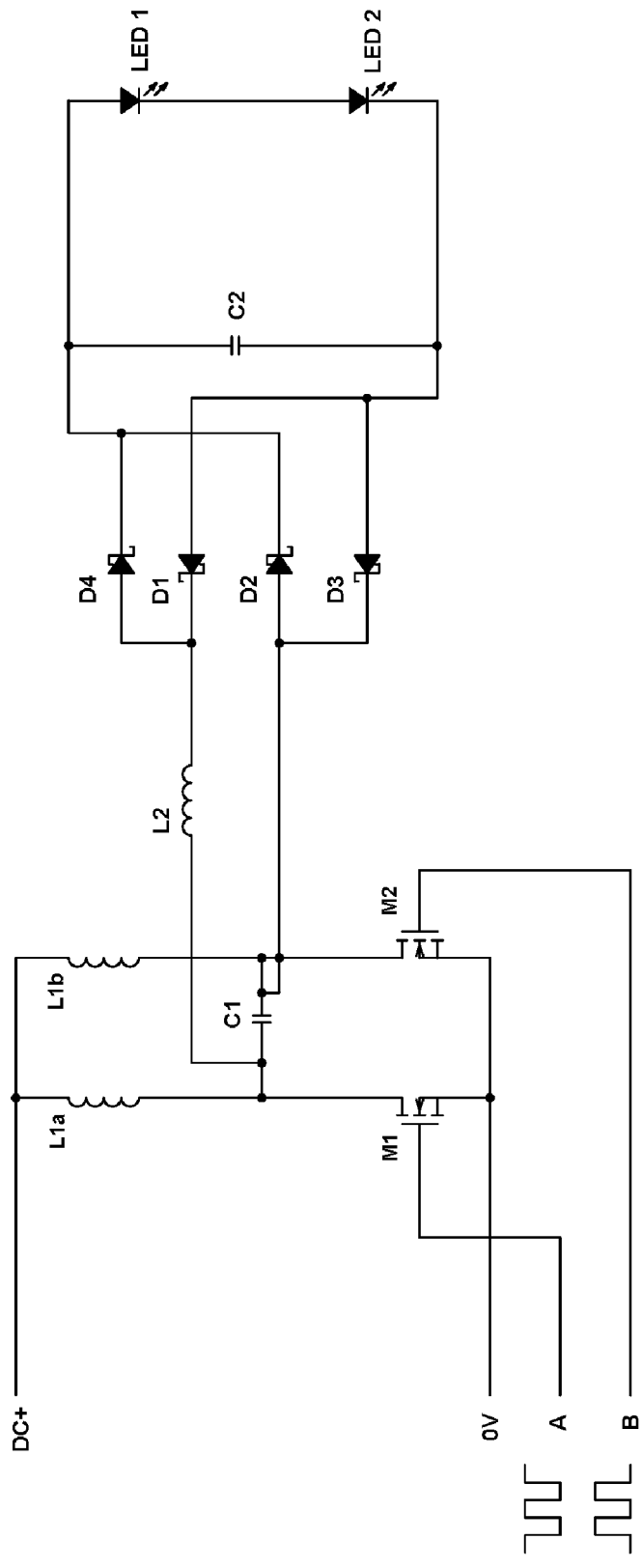
FIG. 6 is a schematic diagram of a fourth alternative to the circuit shown in FIG. 2.

A further embodiment of the power adaptor according to invention is shown in FIG. 6. This embodiment is similar to the previous embodiments, in that it comprises an LCL series-parallel resonant circuit (L1, C1, L2), a pair of potential-dividing capacitors (C2, C3), and a schottky diode bridge (D1-D4) and a capacitor (C4) at its output. The output is connected to two LEDs (LED 1 and LED 2), which are connected in series.

However, this embodiment differs from the previous embodiments in that the resonance drive circuit comprises two FETs (M1, M2) connected between the LCL series-parallel resonant circuit and ground, ie two "low-side" switches. These two low-side switches each alternate between ON and OFF, which a first switch being ON whilst a second switch is OFF, and vice versa, so as to create a square-wave driving signal.

Furthermore, the first resonant inductor (L1) of the LCL series-parallel resonant circuit of the previous embodiments has been replaced by two inductors (L1a and L1b), one connected to one end of the capacitor C1, and the other connected to the other end of the capacitor C1. In this arrangement, one of these two inductors (L1a) will be active in the positive half cycle of the resonant frequency at the output, and the other of these two inductors (L1b) will be active in the negative half cycle of the resonant frequency at the output.

This embodiment is particularly advantageous in arrangements in which the switches (M1, M2) are driven by a low voltage controller, such as an integrated circuit.

Figure 7:
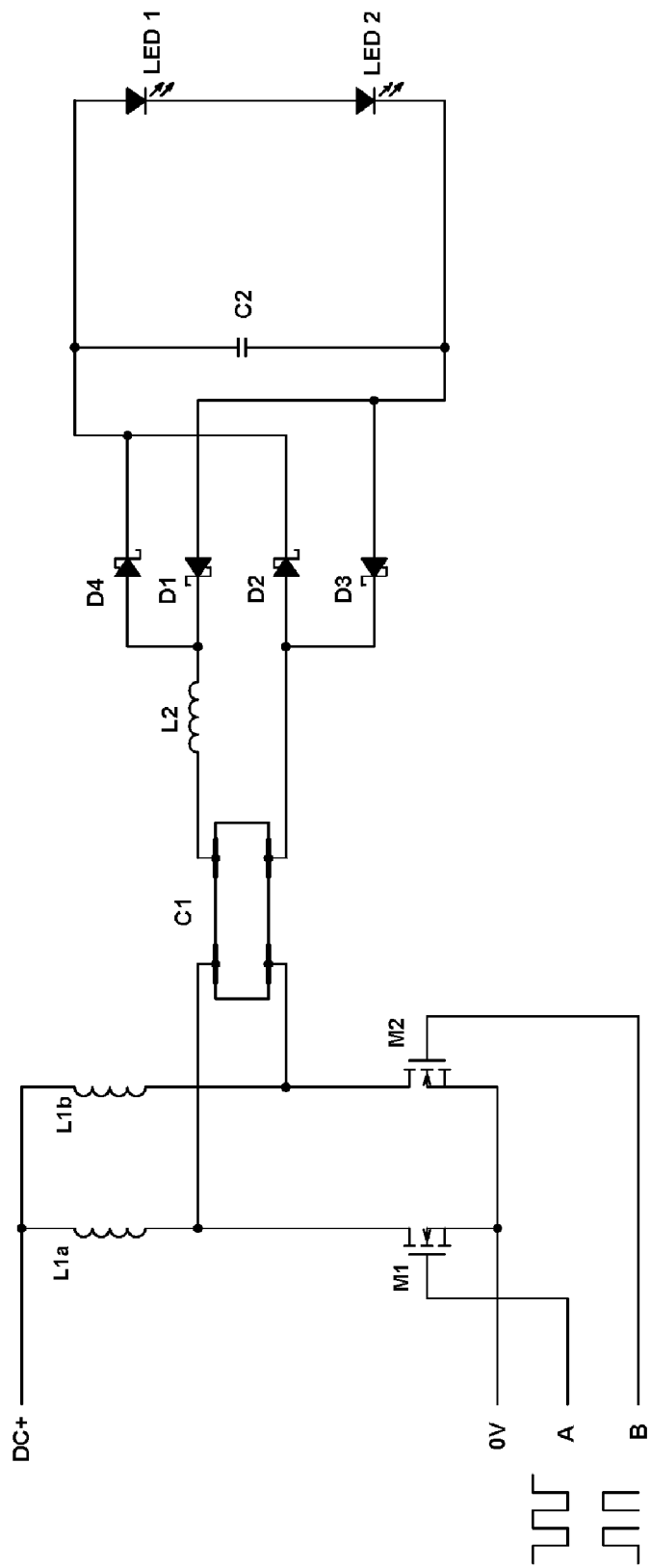
FIG. 7 is a schematic diagram of a fifth alternative to the circuit shown in FIG. 2.

A further embodiment of the power adaptor according to invention is shown in FIG. 7. This embodiment is identical to the embodiment shown in FIG. 6, save for the inclusion of a piezoelectric transformer in an arrangement that corresponds to the arrangement shown in FIG. 5. This embodiment combines the advantages discussed above in relation to FIGS. 5 and 6.

Figure 8:
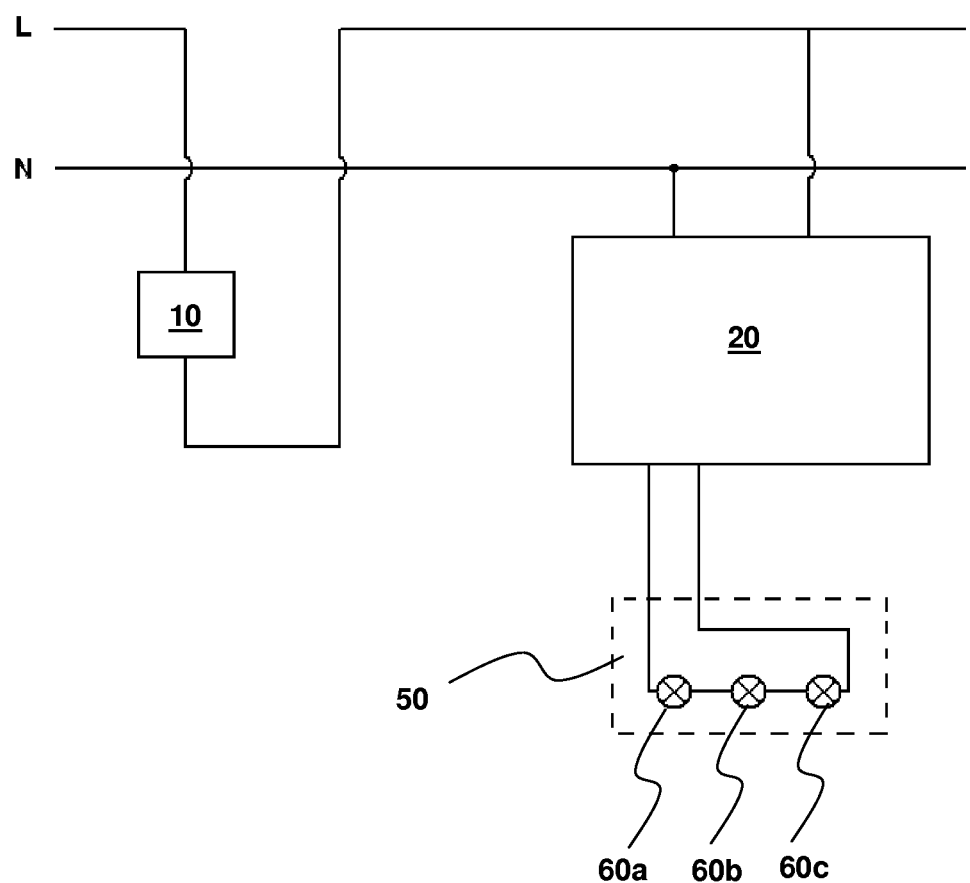
FIG. 8 is a schematic diagram of a lighting system according to the invention.

Finally, FIG. 8 shows a lighting system according to the invention. The lighting system is connected to a mains circuit including a mains supply L,N and a power reducing device 10, such as a TRIAC, and comprises a power adaptor 20 according to the invention and a solid state lighting unit 50. The solid state lighting unit 50 comprises three LEDs 60a,60b,60c connected in series. The power adaptor 20 is supplied with electrical power from the mains circuit, and is adapted to provide electrical power to the LEDs 60a,60b,60c of the solid state lighting unit 50.

The invention claimed is:
1. A power adaptor for one or more solid state light sources comprising:

an input for connection to a dimmer control device and an AC power supply; and, a resonant circuit including an LCL series-parallel resonant circuit coupled to the input that provides an output suitable for driving the one or more solid state light sources, wherein the resonant circuit includes a controller and electronic switches for driving the LCL series-parallel resonant circuit, the controller being adapted to use on-time modulation of the switches to determine the waveform of the current drawn from the input by the resonant circuit such that the power adaptor draws a minimum current from the AC power supply to keep the dimmer control device stable.

2. A power adaptor as claimed in claim 1, wherein the LCL series-parallel resonant circuit has a first resonant frequency that provides, at a given input voltage, a constant current output that is independent of the load, and a second resonant frequency that provides, at a given input voltage, a current that varies with load, the second resonant frequency providing a significantly greater power at the output, relative to the first resonant frequency, and the controller of the power adaptor being adapted to switch between the resonant frequencies.

3. A power adaptor as claimed in claim 1, wherein the resonant circuit is configured to provide an output having a substantially constant voltage, which is predetermined for a particular effective voltage of the AC power supply.

4. A power adaptor as claimed in claim 3, wherein the resonant circuit is configured to either boost (i.e., raise) or buck (i.e., lower) the actual voltage received at the input of the power adaptor, in order to provide a substantially constant voltage, which is pre-determined for a particular effective voltage of the AC power supply, for the majority of the input AC cycle.

5. A power adaptor as claimed in claim 1, wherein the power adaptor is adapted to turn off the output, when the load is insufficient to be driven by the output provided by the power adaptor, and then turn on the output when the load is sufficient to be driven by the output provided by the power adaptor.

6. A power adaptor as claimed in claim 1, wherein the resonant circuit is adapted such that at one of its resonant frequencies, the power adaptor provides a constant current output, at a given effective input voltage, and the resonant circuit is driven at that resonant frequency or a sub-harmonic thereof.

7. A power adaptor as claimed in claim 1, wherein the capacitance of the LCL series-parallel resonant circuit is selected with a reactance $X_{C1}$ to match a required load resistance $R_L$ and a required input resistance $R_{in}$ for the resonant circuit.

8. A power adaptor as claimed in claim 7, wherein the capacitance is selected with a reactance that is equal to the square-root of the product of the required load resistance $R_L$ and the required input resistance $R_{in}$ for the resonant circuit.

9. A power adaptor as claimed in claim 1, wherein the resonant circuit is configured to provide an output having an increased current relative to the current through a resonant inductor, such that the output has a correspondingly decreased effective voltage relative to the effective voltage of the power supply.

10. A power adaptor as claimed in claim 1, wherein the controller comprises an integrated circuit.

11. A lighting unit comprising a power adaptor as claimed in claim 1 and one or more solid state light sources.

12. A power adaptor for one or more solid state light sources comprising an input for connection to an AC power supply, and an LCL series-parallel resonant circuit coupled to the input that provides an output suitable for driving the one or more solid state light sources, wherein the lighting unit includes a controller and electronic switches for driving the resonant circuit, the controller being adapted to use on-time modulation of the switches to determine the waveform of the current drawn from the input by the resonant circuit, and wherein the capacitance of the LCL series-parallel resonant circuit is selected with a reactance $X_{C1}$ to match a required load resistance $R_L$ and a required input resistance $R_{in}$ for the resonant circuit.

13. A power adaptor as claimed in claim 12, wherein the capacitance is selected with a reactance that is equal to the square-root of the product of the required load resistance $R_L$ and the required input resistance $R_{in}$ for the resonant circuit.

* * * * *